United States Patent [19]

Smith

[11] Patent Number: 4,840,091

[45] Date of Patent: Jun. 20, 1989

[54] TRANSMISSION SHIFT MECHANISM

[76] Inventor: Roger R. Smith, 7261 Lyons Rd., Imlay City, Mich. 48444

[21] Appl. No.: 255,800

[22] Filed: Oct. 11, 1988

[51] Int. Cl.⁴ .......................... F16H 5/52; B60K 41/22
[52] U.S. Cl. ........................................ 74/867; 74/337; 74/626
[58] Field of Search .................. 74/867, 337, 335, 626, 74/625, 752 C, 752 B

[56] References Cited

U.S. PATENT DOCUMENTS

| | | | |
|---|---|---|---|
| 1,948,709 | 2/1934 | Hackethal | 74/626 X |
| 2,260,406 | 10/1941 | Roche | 74/867 X |
| 2,957,558 | 10/1960 | Croucher | 74/337 X |
| 3,527,118 | 9/1970 | Jenson et al. | 74/626 |
| 4,282,776 | 8/1981 | Eller | 74/337 X |
| 4,420,994 | 12/1983 | Müller et al. | 74/867 |
| 4,616,528 | 10/1986 | Malinski et al. | 74/626 |

Primary Examiner—Dirk Wright
Assistant Examiner—William Gehris
Attorney, Agent, or Firm—Peter A. Taucher; David L. Kuhn

[57] ABSTRACT

Disclosed is a mechanism in a motor vehicle for hydraulically selecting the gears of an automatic transmission. The mechanism is a valve connected to a pressure source and having two sets of outlet ports, one set controlled by a manually operated linkage. The other set of outlet valves is controlled by a gear-shift mechanism responsive to reaction torque on an output shaft. The gear shift mechanism includes a planetary gear set connected between the output shaft and an input shaft leading from the transmission. The planetary gear set has a ring gear linked to a lever rotating an apertured ring in the housing. Rotating the ring selectively opens or blocks access to ports of the second set. The linkage between the planetary gear set and the valve has means to bias the planetary gear to a position corresponding to the "drive" mode of the automatic transmission.

17 Claims, 3 Drawing Sheets

TRANSMISSION SHIFT MECHANISM

GOVERNMENT INTEREST

The invention described herein may be manufactured, used, and licensed by or for the Government for governmental purposes without payment to me of any royalty thereon.

BACKGROUND AND SUMMARY

The invention relates to transmissions for motor vehicles and more specifically relates to mechanisms for changing gears of automatic transmissions.

Present invention transmission are either manually shifted or have automatic shifting mechanisms typically actuated via the engine manifold vacuum. The prior art automatic shifting mechanisms depend on engine characteristics and are largely limited to vehicles having a single internal combustion engine; use of power plants other than internal combustion engines or use of multiple power plants with automatic transmissions is generally not practical. My invention solves these problems because it selects gears of an automatic transmission in response to the torque on a shaft following the transmission in the vehicle drive train. The shift points for automatic shifting of the transmission can be changed by replacing a few internal parts of a valve of my device or by adjusting a spring which determines torque levels for shift points.

DETAILED DESCRIPTION

Figure 1:
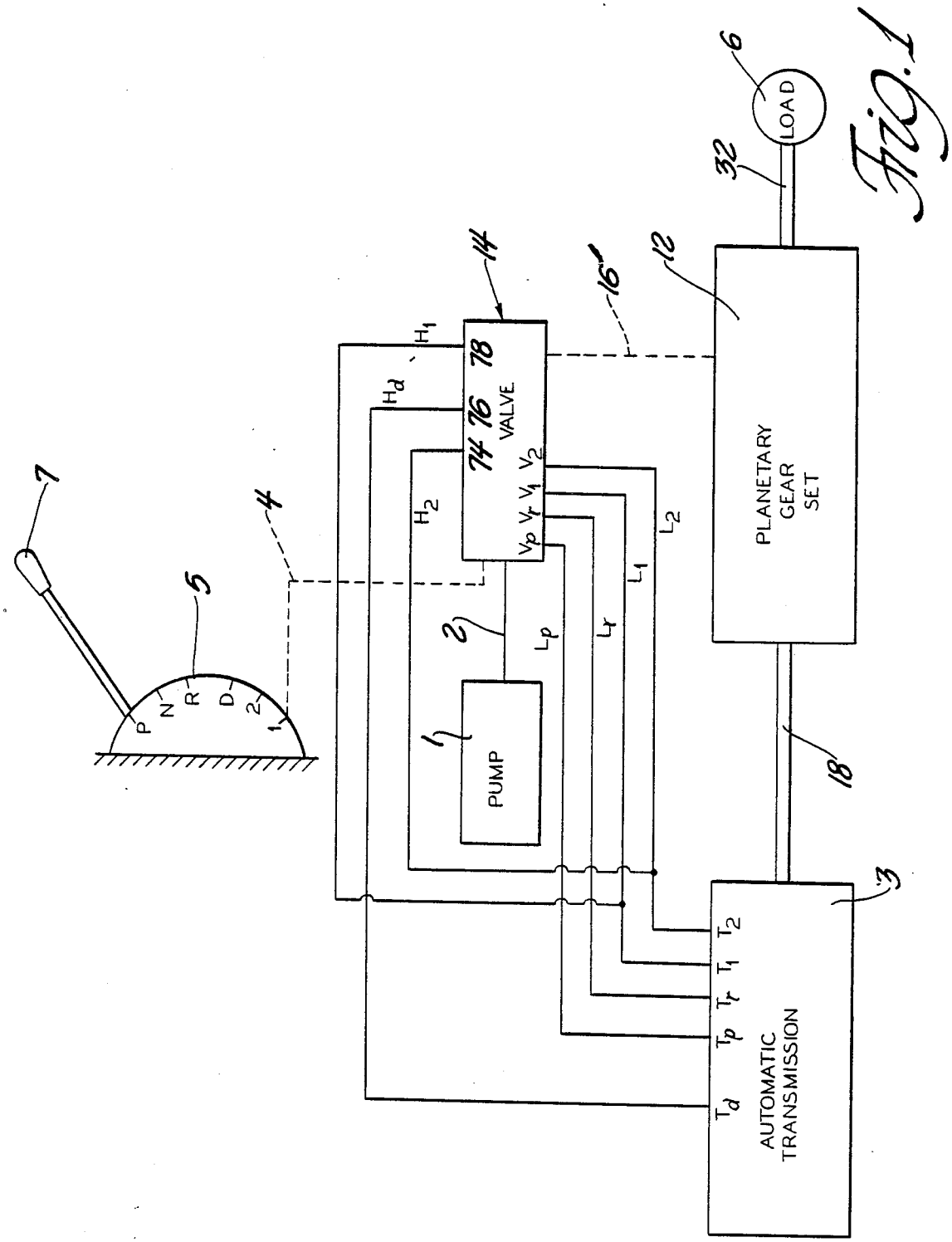
FIG. 1 is a semi-schematic overview of my gear selecting mechanism and the system in which it is incorporated.

FIG. 1 is a semi-schematic overview of a system incorporating my transmission shift mechanism, which is controlled by selector valve 14. Valve 14 can in turn be controlled by means of a manual control mechanism 5 having a lever 7 moveable to the P, N, R, D, 2 and 1 positions corresponding to the park, neutral, reverse, drive, second gear and first gear modes of automatic transmission 3. A mechanical linkage schematically represented by line 4 connects manual control mechanism 5 to valve 14 so that movement of lever 7 opens or closes ports in the valve.

Figure 3:
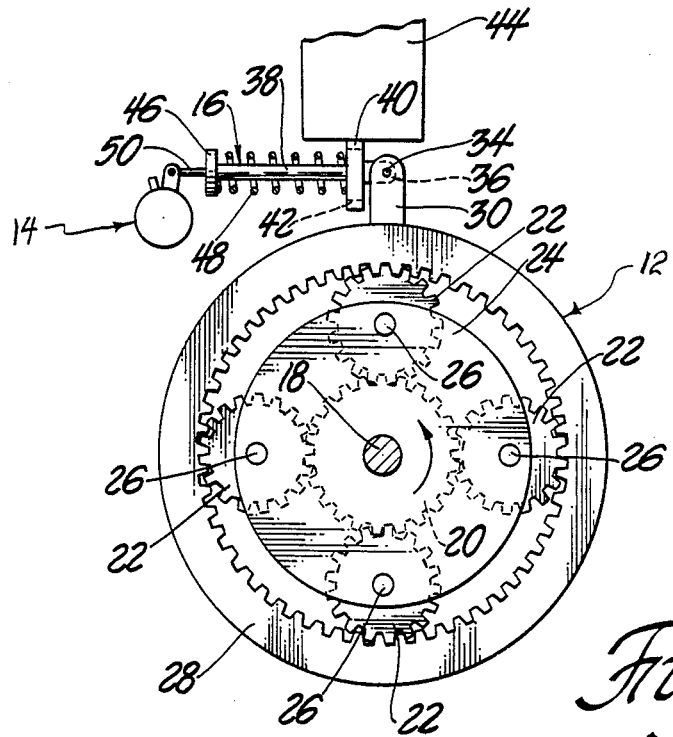

As will be more fully explained, valve 14 can also be controlled by planetary gear set 12 through mechanical linkage 16' which schematically represents arm assembly 16 (FIG. 3). Planetary gear set 12 is a connection between output shaft 32 leading to a load 6 such as the drive axle of a vehicle and input shaft 18 leading from automatic transmission 3. Planetary gear set moves linkage 16' as a function of reaction torque on shaft 32 from load 6. One of passages 74, 76 or 78 of the valve is open, depending on the position of linkage 16'.

Valve 14 controls automatic transmission 3 by selectively distributing the fluid pressure it receives from pump 1 through hydraulic line 2. The pressure of fluid from line 2 is ultimately communicated to ports $T_d$, $T_p$, $T_r$, $T_1$ and $T_2$ on the automatic transmission, which are associated respectively with the drive, park, reverse, first gear, and second gear modes of the transmission. When lever 7 is manually moved to the P, R, 1 or 2 positions, a respective valve port $V_p$, $V_r$, $V_1$ or $V_2$ opens, fluid under pressure flows through one of lines $L_p$, $L_r$, $L_1$ or $L_2$ to the associated ports $T_p$, $T_r$, $T_1$ or $T_2$ on transmission 3. When lever 7 is manually moved to N or neutral position, there is flow neither from the ports $V_p$, $V_r$, $V_1$ and $V_2$ nor from passages 74, 76, and 78 and transmission 3 is in the neutral mode. When lever 7 is in the D or drive position, all of ports $V_p$, $V_r$, $V_1$ and $V_2$ are closed and one of passages 74, 76, or 78 receives pressurized fluid from line 2 depending on the position of mechanical linkage 16'. As will be seen later, valve 14 is constructed so that none of passages 74, 76 and 78 receive pressurized fluid unless ports $V_p$, $V_r$, $V_1$ and $V_2$ are closed. Passage 78 is associated with the first gear mode of the automatic transmission and communicates with transmission port $T_1$ via lines $H_1$ and $L_1$. Passage 76 is associated with the drive mode of the automatic transmission and communicates with transmission port $T_d$ through line $H_d$. Passage 74 is associated with the second gear mode of the automatic transmission and communicates with port $T_2$ on the automatic transmission via lines $H_2$ and $L_2$.

Figure 2:
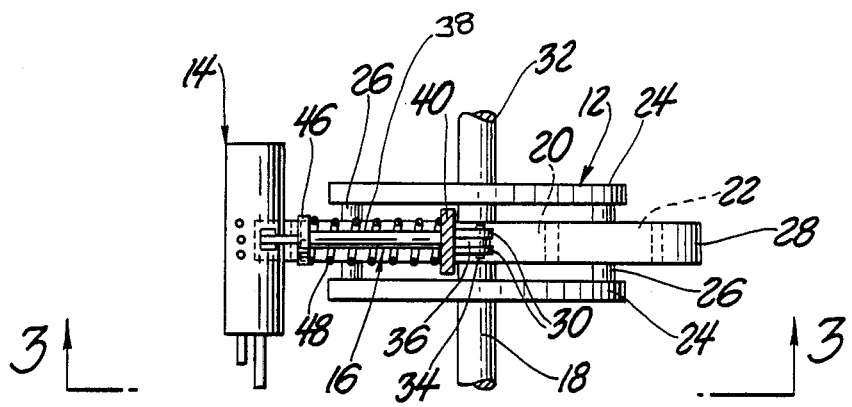
FIGS. 2 and 3 are views of my gear selecting mechanism showing its valve, its planetary gear set, and the arm assembly connecting the gear set to the valve.

In FIGS. 2 and 3 is shown gear selector assembly 10 comprised of three subassemblies, which are planetary gear set 12, selector valve 14, are arm assembly 16, which connects the gear set to the valve. Planetary gear set 12 is driven by an input shaft 18 leading from automatic transmission and in turn drives sun gear 20 of the planetary gear set. Meshed with sun gear 20 are several planet gears 22, which orbit about sun gear 20 on a planet gear carrier having two parallel carrier disks 24 and spindles 26 connected between the disks. Planet gears 22 are coaxial with respective spindles 26 and can rotate upon these spindles while orbiting about sun gear 20. Meshed with planet gears 22 is ring gear 28 having spaced apart tabs 30 by which the ring gear is pivotally linked to to arm assembly 16. On the side of planetary gear set opposite from input shaft 18, there is an output shaft 32 fixed to one of the carrier disks 24. It is noted that carrier disks 24 both rotate relative to input shaft 18 but are fixed relative to output shaft 32.

Figure 5:
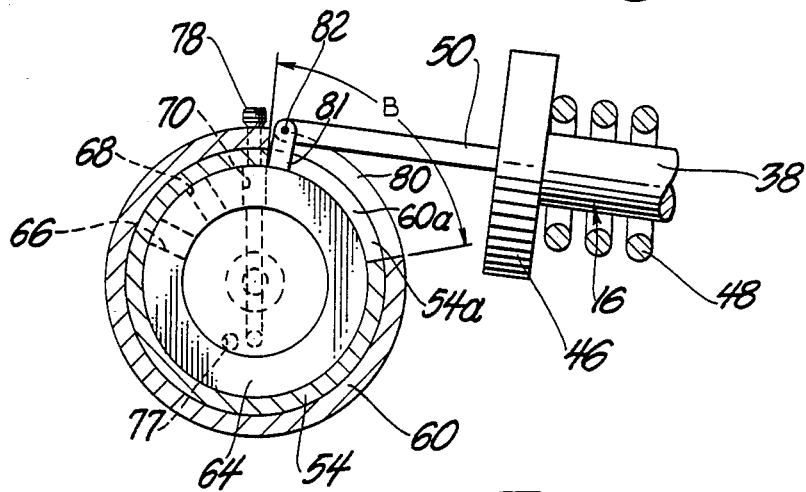
FIG. 5 is a view taken along line 5—5 in FIG. 4.

Again referring to FIGS. 2 and 3, arm assembly 16 is linked to ring gear 28 by means of a flat finger 36 of the arm assembly. Finger 36 is linked to tabs 30 on the ring gear by pin 34 journalled through tabs 30 and finger 36 so as to permit relative movement between tabs 30 and finger 36. Finger 36 is one end of a rod 38 passing through a stationary spring retention plate 40, which is fixed to a vehicle structural member 44. As seen in FIG. 3, plate 40 has a hole 42 which accommodates upward and downward movement of rod 38 as the rod translates to the left or right. Fixed at the other end of rod 38 is a spring retention collar 46 to compressively keep return spring 48 against plate 40. The coils of spring 48 are wound around rod 48 and will collapse together as rod 38 translates rightward from its FIG. 3 position. Spring 48 "goes solid" after a predetermined amount of rightward movement of rod 38, thereby stopping the rod's rightward progress. As best seen in FIG. 5, there extends from spring retention collar 46 a digit 50, which connects arm assembly 16 to selector valve 14.

Figure 4:
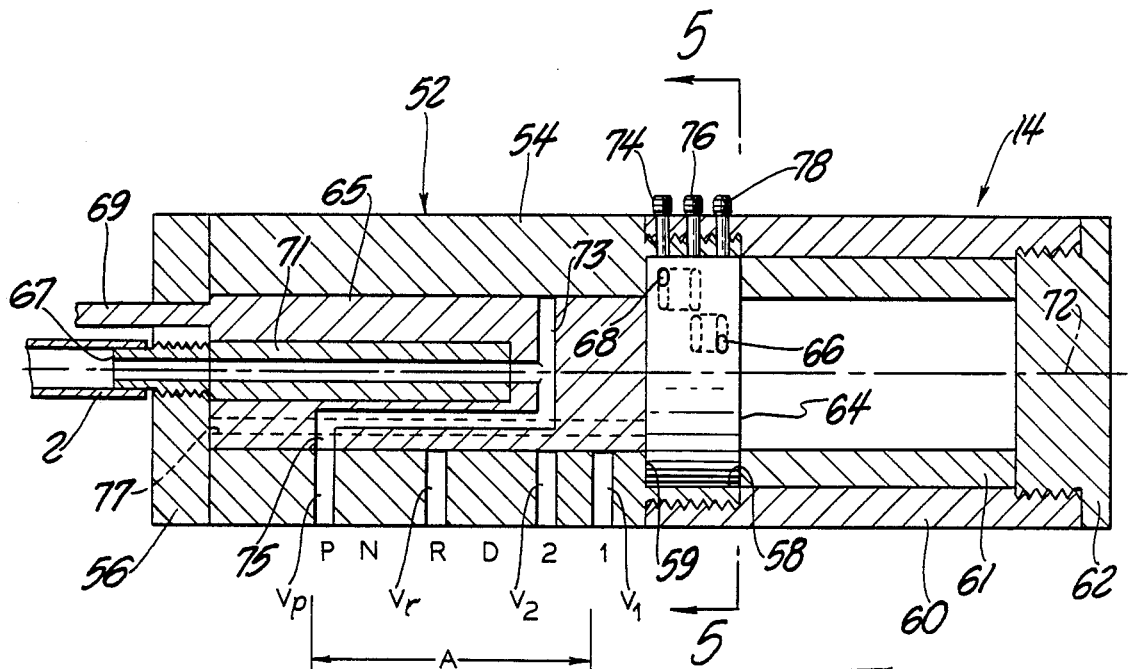
FIG. 4 is a sectional view of the valve. A ring inside the valve is not sectioned and certain elements attached to the valve are omitted from this figure to achieve illustrative clarity.

Selector valve 14 is best shown in FIGS. 4 and 5. Housing 52 of valve 14 is comprised of several parts, one being cylinder 54 closed at one end by a wall 56 suitably sealed and affixed to the cylinder. At the other end of cylinder 54 is a step 58 and an internal shoulder 59 formed by the inner surface of the cylinder, there being threads formed on the outer surface of the cylinder. Threaded to cylinder 52 is a barrel 60 closed at one end by a screw cap 62, which is threadingly engaged to the inner diameter of the barrel.

Inside housing 52, closely fitting in step 58 is rotatable ring 64 coaxial with the housing elements noted above. The inner peripheral surface of ring 64 is flush with the inner peripheral surface of cylinder 52. As best seen by viewing FIGS. 4 and 5 together, ring 64 has three passages 66, 68, and 70 extending generally radially from the inner peripheral surface of the ring to the outer peripheral surface of the ring. The radially inner ends of passages 66, 68, and 70 are symmetrically divided by a plane perpendicular to axis 72 of housing 52. The radially outer ends of passages 66, 68 and 70 are spaced apart along axis 72 so that each of the outer ends intersects a different plane perpendicular to axis 72. As best seen in FIG. 5, these passages are angularly spaced apart by approximately 15 to 30 degrees about axis 72.

Housing 52 defines three conduits 74, 76, and 78 disposed so that their radially inner ends can align with respective radially outer ends of passages 66, 68 and 70. Depending on the rotational position of ring 64, passage 68 mates with conduit 74 or passage 70 mates with conduit 76 or passage 66 mates with conduit 78, only one of the matings occurring at a time. The portions of conduits 74, 76 and 78 extending out of housing 52 are externally threaded to facilitate connection between these conduits and line leading to transmission 3.

Housing 52 defines an arcuate slot 80 as shown in FIG. 5, but omitted from FIG. 4 for clarity in the latter figure. Slot 80 has an angular dimension B preferably between 70 and 80 degrees and has a sidewall comprised of arcuate surfaces 54a and 60a of cylinder 56 and barrel 60, respectively. Link member 81 within slot 80 is fixed to ring 64 and rotates therewith. Link member 81 is pivotally connected to digit 50 by a pin 82 journalled through both digit 50 and link member 81, whereby translational motion of arm assembly 16 turns ring 64. The housing also defines several ports $V_p$, $V_r$, $V_1$ and $V_2$ which communicate to automatic transmission 3. These ports are at positions "P", "R", "2" and "1" on the housing and correspond to the park, reverse, second gear and first gear of the automatic transmission.

Within valve housing 52 and closely axially fit between ring 64 and screw cap 62 is spacer sleeve 61, whose outer diametrical surface bears against the inner peripheral surface of barrel 60. The inner diametrical surface of sleeve 61, ring 64, and cylinder 54 are flush with one another so as to provide a smooth internal sliding surface for piston 65, which translates along axis 72. Piston 65 also sealingly slides upon an elongate tube 71 which is fixed to wall 56 of the housing and communicates with inlet fitting 67 screwed into wall 56. Inlet fitting 67 in turn communicates with a pressure source such as pump 7 shown in FIG. 1. The piston also has an extension 69 passing sealingly through wall 56 which is mechanically connected a manual shift lever 7 in the driver's compartment of a vehicle.

Piston 65 defines two fluid ducts which communicate with tube 71. The first is duct 73, which can be aligned by translation of piston 65 into registry with one of passages 66, 68, or 70 in ring 64. The second is duct 75, which can be registered with one or ports $V_p$, $V_r$, $V_2$, or $V_1$. As viewed in FIG. 4, piston 65 is in its leftwardmost position, where duct 75 registers with passage $V_p$. Duct 75 can be translated rightward as far as distance "A" whereupon duct 75 registers with duct $V_1$. At all times when piston 65 translates to move duct 75 along dimension A, piston 65 maintains a seal with tube 71. Piston 65 also has an axial passage 77 extending therethrough to allow fluid to pass from one side of piston 65 to the other when the piston translates within housing 52. It may be desirable to make passage 77 a flow restrictive passage so as to limit the speed with which piston 65 can be translated. So limiting piston speed would slow the travel of duct 75 between ports leading to transmission 3, thereby preventing overly abrupt manual gear range changes in the transmission.

OPERATION OF SELECTOR VALVE

When a vehicle operator moves lever 7 of manual control 5 to the park position, piston 65 is mechanically translated to its FIG. 4 position. Pressurized fluid enters piston 65 from line 2 and passes along conduit 75 and exists through port $V_p$, which is the "park" valve port. No fluid flows through conduit 73 in piston 65 since line 75 is blocked by the inner peripheral wall of cylinder 54. When lever 7 is in the neutral position, piston 65 is mechanically translated rightward as seen in FIG. 4 such that conduit 75 is in the "N" position approximately midway between port $V_p$ and port $V_r$, the "reverse" port. Both conduits 73 and 75 are blocked by the inner peripheral surface of cylinder 54, so no pressurized fluid is sent to transmission 3, which consequently enters the neutral mode. When lever 7 is in the reverse position, piston 65 is translated further rightward so that conduit 75 aligns with and passes fluid to port $V_r$, and conduit 75 is blocked by the inner peripheral surface of ring 64. When lever 7 is moved to the D or drive position, piston 65 is further mechanically translated to the right, so that conduit 75 is in the D position between port $V_r$ and port $V_2$, the "second gear" valve port. Conduit 73 will be in the same plane as the radially inner ends of passages 66, 68 and 70 in ring 64 and will register with one of these passages, depending on the rotational position of ring 64. When lever 7 is moved to the "2" position, piston 65 is translated further rightward so that conduit 75 aligns with and passes fluid to port $V_2$ and conduit 73 is blocked by the inner peripheral surface of sleeve 61. When lever 7 is moved to the "1" position piston 65 is mechanically translated to its rightwardmost position so that conduit 75 aligns with and passes fluid to port $V_1$ (the "first gear" port) and conduit 73 is blocked by the inner peripheral surface of sleeve 61.

When piston 65 is in the "drive" position, where piston duct 73 can communicates with one of ducts 74, 76 or 78, transmission 3 will be in drive, first gear or second gear depending on the position of ring 64, whose position in turn ultimately depends on the reaction torque experienced by output shaft 32.

Referring again to FIG. 3, input shaft and sun gear 20 rotate counterclockwise and ring gear 28 tends to be held in place by its attachment to arm assembly 16, whereby planet gears 22 and their spindles 26 orbit counterclockwise about sun gear 20. The planet gears also rotate clockwise relative to carrier spindles 26. Output shaft 32 (FIG. 2) is fixed relative to spindles 26 and therefore rotates in concert with the orbit of spindles 26. As load 6 (FIG. 1) exerts more reaction torque on output shaft 32, this shaft's rotation slows and the counterclockwise orbit speed of spindles 26 also slows, so the clockwise rotation of planet gears 22 drives ring gear 28 clockwise against the bias of spring 48. Ring gear 28 rotates clockwise until the torque created by the compressive resistance force of spring 48 acting on tabs 30 balances the reaction torque on shaft 32. The clockwise movement of ring gear 28 causes clockwise movement of ring 64 via a linkage comprised of tabs 30, rod 38, digit 50 and link member 81. A sufficient increase in reaction torque will, for example, cause passage 70 in ring 64 to move out of registry with duct 76 in housing 52 and will cause ring passage 68 to move into registry with housing duct 74, whereby the transmission shifts from drive to second gear.

I wish it to be understood that I do not desire to be limited to the exact details of construction shown and described for obvious modifications will occur to a person skilled in the art, without departing from the spirit and scope of the appended claims.

I claim:

1. A mechanism for selecting the gear of an automatic transmission in a vehicle, comprising:
   a pressure source;
   a gear selection valve having an inlet means for receiving fluid from the pressure source, first outlet ports, and second outlet ports;
   a manual override means for opening and blocking communication between the pressure source and the first ports and for simultaneously opening and blocking communication between the pressure source and the second outlet ports;
   a port selector means within the valve for controlling flow through the second ports, the port selector means being movable to a plurality of positions, each position permitting a selected second outlet port to open;
   a selector control means for moving the port selector means from one position to another, the selector control means including a planetary gear set connected by an input shaft to the transmission and connected to a vehicle load by an output shaft, the planetary gear set having a ring gear whose angular position is a function of reaction torque imposed by the load on the output shaft, the selector control means further including an arm assembly connected between the ring gear and the port selector means so that the position of the port selector means is a function of the reaction torque on the output shaft.

2. The mechanism of claim 1 wherein the arm assembly includes a rod having one end provided with a retention collar and another end translatably passing through a plate fixed to the vehicle, a compression spring coiled on the rod between the collar and the plate, a digit extending from the retention collar into pivotal connection with the port selector means and a finger formed on the other end for pivotal connection to a radially extending tab on the ring gear, whereby the spring inhibits movement of the tab away from the plate.

3. The mechanism of claim 2 wherein the tab is fixed to the ring gear and rotates therwith and the plate is disposed in the rotational path of the tab, whereby the rotation of the ring gear in a first direction is limited.

4. The mechanism of claim 3 wherein the spring compresses as the ring gear rotates opposite from the first direction, the coils of the spring collapsing together after a predetermined amount of ring gear rotation in the opposite direction.

5. The device of claim 4 wherein the planet gear set includes a sun gear coaxially fixed to the input shaft, a planet gear carrier fixed to the output shaft, a plurality of planet gears rotatably mounted on the planet gear carrier, the planet gears being located radially between and meshed with the sun gear and the ring gear.

6. The mechanism of claim 1 wherein the valve includes a housing disposed along a central axis with the second outlet ports spaced axially along the housing and the port selector means includes a ring rotatable about the central axis for bearing against the inner wall of the housing in the zone where the second outlet ports are located, the ring defining radially spaced passages from its inner surface to its outer diametrical surface, the second outlet ports and the outer openings being arranged such that movement of the ring to chosen rotational positions registers a selected outer opening with a selected second outlet port.

7. The mechanism of claim 6 wherein inner openings of the passages face toward a common point on the central axis and outer openings of the passages are axially spaced from one another.

8. The mechanism of claim 6 wherein the arm assembly includes a digit extending toward the valve and the selector control means includes an elongate protrusion on the ring pivotally engaged to the digit.

9. The mechanism of claim 1 wherein the valve has an inner peripheral wall which cooperates with the selector control means define a smooth cylinder inside the valve and the manual override means includes a piston translatable in the cylinder along the central axis whereby the piston can slide through the selector control means.

10. The mechanism of claim 9 wherein the piston defines a first internal conduit communicated with the pressure source for passing fluid to first ports in the valve and a second internal conduit for passing fluid to the second outlet ports in the valve.

11. The mechanism of claim 10 wherein the inlet means includes an axially extending tube fixed to one end wall of the valve for sealing, sliding support of the piston, the end of the tube fixed to the end wall being open to the pressure source, the opposite end of the tube open to the first and second conduits in the piston.

12. The mechanism of claim 11 wherein the inwardly facing openings of the first outlet ports are aligned along a line parallel to the central axis.

13. The mechanism of claim 12 wherein the manual override means includes an extension fixed to the piston passing axially through the end wall of the valve, whereby the piston can not rotate about the central axis.

14. The mechanism of claim 13 wherein the internal volume of the valve not occupied by the piston and the port selector means is filled with fluid, and the piston is translated in the valve during actuation of the mechanical override means, there being means in the valve for permitting fluid to travel from one end of the housing to the other end when the piston translates.

15. The mechanism of claim 14 wherein the permitting means has a means to restrict the flow rate of fluid therethrough, thereby slowing the mechanical override means in moving the piston from one axial position to another.

16. The mechanism of claim 15 wherein the piston defines an axial passage therethrough to form the permitting means.

17. The mechanism of claim 1 wherein:
the valve has a housing which includes a cylindrical body closed at one end and configured at the other end to form an internal shoulder, the housing also including a barrel member closed at a first end by a screw cap and threaded at the opposite end for complimentarily concentric, screw-together engagement with the cylindrical body, the concentrically engaged portions of the cylindrical body and barrel together defining the second outlet ports; and the port selector means comprises a rotatable apertured ring coaxial with the concentrically engaged portions, the ring held against the shoulder by a removable spacer sleeve closely fit within the barrel and disposed between the screw cap and the port selector means, whereby the port selector means can be removed and replaced in the housing either after disengaging the cylindrical body and barrel or after removing the screw cap and spacer sleeve from the housing.

* * * * *